US010842127B2

(12) United States Patent
Landry (10) Patent No.: US 10,842,127 B2
(45) Date of Patent: Nov. 24, 2020

(54) ANIMAL FEEDING SYSTEM (71) Applicant: DeerRoots, LLC, Stillwater, OK (US)

(72) Inventor: Michael Landry, Stillwater, OK (US)

(73) Assignee: DEERROOTS, LLC, Stillwater, OK (US)

(*) Notice: Subject to any disclaimer, the term of this patent is extended or adjusted under 35 U.S.C. 154(b) by 244 days.

(21) Appl. No.: 15/970,547

(22) Filed: May 3, 2018

(65) Prior Publication Data
US 2018/0317449 A1 Nov. 8, 2018

Related U.S. Application Data (60) Provisional application No. 62/500,582, filed on May 3, 2017.

(51) Int. Cl.
A01K 5/02 (2006.01)
A01K 39/014 (2006.01)
A01K 5/01 (2006.01)

(52) U.S. Cl.
CPC .......... *A01K 5/0291* (2013.01); *A01K 5/0225* (2013.01); *A01K 39/014* (2013.01); *A01K 5/01* (2013.01)

(58) Field of Classification Search
CPC ...... A01K 5/0291; A01K 5/0225; A01K 5/02; A01K 39/014; A01K 39/00
See application file for complete search history.

(56) References Cited

U.S. PATENT DOCUMENTS

| | | | | |
|---|---|---|---|---|
| 903,309 A * | 11/1908 | Ottinger | ............... | A01K 39/012 119/52.1 |
| 1,005,071 A * | 10/1911 | Randall | ................ | A01K 39/012 119/52.1 |
| 1,021,209 A * | 3/1912 | Platt | ..................... | A01K 5/0114 119/51.5 |
| 1,120,178 A * | 12/1914 | Berghofer | ............ | A01K 5/0114 119/51.01 |
| 3,196,835 A * | 7/1965 | Bergevin | ............. | A01K 5/0291 119/51.11 |
| 5,253,732 A | 10/1993 | Daniels | | |
| 5,275,129 A | 1/1994 | Vigesaa et al. | | |
| 6,053,282 A | 4/2000 | Morisak | | |
| 6,082,300 A | 7/2000 | Futch | | |
| 6,604,606 B1 | 8/2003 | McDougal et al. | | |
| 6,622,653 B1 | 9/2003 | Starnes, Jr. | | |
| 6,779,487 B1 | 8/2004 | Kochan | | |
| 7,954,454 B2 | 6/2011 | Lewis | | |
| 8,096,265 B1 | 1/2012 | Wisecarver | | |
| 8,573,156 B2 * | 11/2013 | Gates | ................... | A01K 5/0225 119/52.1 |

(Continued)

FOREIGN PATENT DOCUMENTS

FR 501357 A * 4/1920 ............. B65D 88/28

*Primary Examiner* — Kristen C Hayes
(74) *Attorney, Agent, or Firm* — Hall Estill Attorneys at Law; Tyler J. Mantooth (57) ABSTRACT An animal feeding system can consist of at least a housing physically supported by a stand a predetermined distance above a ground level. A first dispensing assembly may be attached to a first dispensing aperture of the housing while a second dispensing assembly is attached to a second dispensing aperture of the housing. The first dispensing assembly and second dispensing assemblies can be different and physically separated.

18 Claims, 5 Drawing Sheets (56) References Cited

U.S. PATENT DOCUMENTS

| | | | |
|---|---|---|---|
| 8,651,053 B2 | 2/2014 | Reid | |
| 8,833,521 B1 | 9/2014 | Jude | |
| 9,854,784 B2 * | 1/2018 | Frieden | A01K 5/02 |
| 10,494,173 B2 * | 12/2019 | Sheppard | B65D 90/626 |
| 2010/0307421 A1 * | 12/2010 | Gates | A01K 5/0225 |
| | | | 119/56.1 |
| 2016/0302383 A1 * | 10/2016 | Frieden | A01K 5/02 |
| 2017/0150697 A1 * | 6/2017 | Encarnacion | H04N 7/142 |

* cited by examiner

ANIMAL FEEDING SYSTEM

RELATED APPLICATION

The present application makes a claim of domestic priority under 35 U.S.C. 119(e) to U.S. Provisional Patent Application No. 62/500,582 filed May 3, 2017, the contents of which are hereby incorporated by reference.

SUMMARY

An animal feeding system, in accordance with some embodiments, has a housing physically supported by a stand a predetermined distance above a ground level. A first dispensing assembly may be attached to a first dispensing aperture of the housing while a second dispensing assembly is attached to a second dispensing aperture of the housing. The first dispensing assembly and second dispensing assemblies can be different and physically separated.

In other embodiments, an animal feeding system has a housing elevated a distance above a ground level by a stand with the housing having first and second separate chambers respectively connected to a gravity tube and an electronic spinning wheel. The gravity tube and electronic spinning wheel are each arranged to independently distribute food from the respective first and second chambers.

An animal feeding system can be operated, in various embodiments, by positioning a housing a predetermined distance above a ground level with a stand prior to inserting a first food into a first chamber of the housing and inserting a second food into a second chamber of the housing. The first and second foods can respectively be dispensed from the housing with a first dispensing assembly via a first dispensing aperture and with a second dispensing assembly via a second dispensing aperture. The first and second dispensing assemblies can be different types of dispensing mechanisms.

DETAILED DESCRIPTION

Assorted embodiments of the present disclosure are generally directed to a system for storing and dispensing feed to animals.

The hunting of various kinds of animals has been practiced for centuries to provide food and increase safety for humans. As food collection became more sophisticated over the past century, hunting has transitioned to more recreational than subsistence. Hence, sport animals, such as deer, elk, turkey, pheasant, and quail, can be cultivated for size and beauty more than for protein. Such cultivation can involve feeding animals over time to ensure proper nutrition and herd health.

While planting particular crops, such as alfalfa, or placing salt licks on the ground can provide nutrients to sport animals, weather and other animals can rapidly degrade the effectiveness and longevity of such feeding techniques. The advent of elevated feeders that drop food at particular times and/or for particular animals can mitigate the loss of food to increase the effectiveness and longevity of a food cache.

In yet, elevated feeders tend to be crudely designed as heavy, substantial structures in order to withstand weather or small, lightweight apparatus in order to be easily transported. That is, a heavy feeder structure is difficult and cumbersome to transport while a small feeder structure easily topples when winds are encountered. All the while, elevated feeders have been limited to dispensing a single type of food in a single manner. For example, most feeder have a single chamber that provides food, such as corn, to a single dispensing means, such as a gravity tube or electronic spreader.

Accordingly, various embodiments of the present disclosure are directed to an animal feeding system that is substantial enough to withstand weather, easily transported, and capable of selectively dispensing two different types of food. The combination of an elevated feeder that is both substantial and easily transported allows a hunter to quickly adapt to changing animal migration patterns or leave a feeder erected during a potentially threatening weather situation. The ability to provide multiple different types of food with different types of dispensing means allows the elevated feeder to service multiple different types of animals and/or provide a feeding pattern that can draw in more of single type of animal. As a result, an animal feeding system configured in accordance with various embodiments of the present disclosure can optimize how food is dispensed to sport animals by providing optimized design, flexibility, and longevity.

Figure 1A:
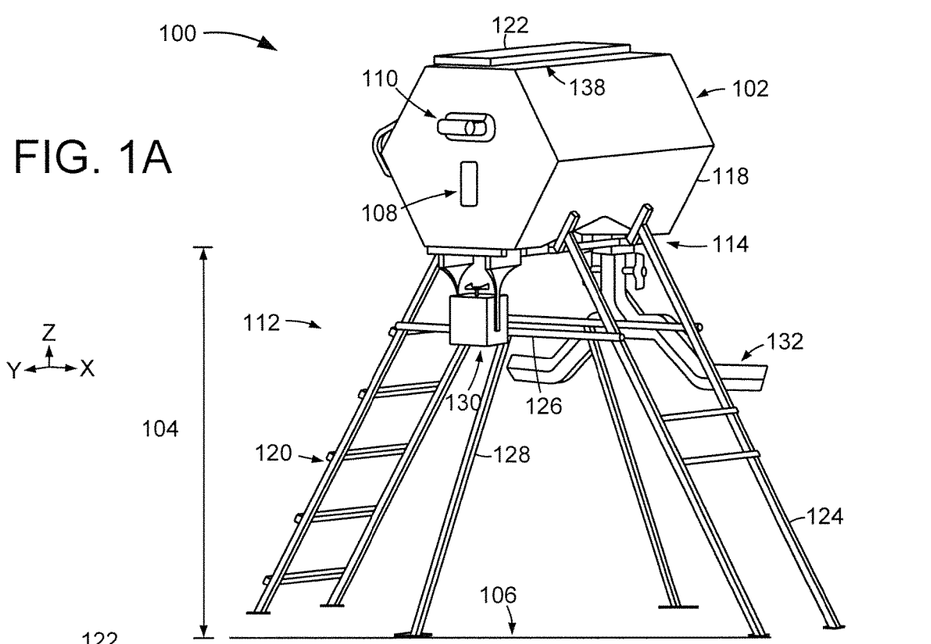
FIGS. 1A-1E respectively represent portions an example animal feeding system constructed and operated in accordance with some embodiments.

FIGS. 1A-1E respectively illustrate different views and assorted portions of an example animal feeder system 100 constructed in accordance with some embodiments. In FIG. 1A, the feeder system 100 is shown having a housing 102 elevated a predetermined distance 104 from a ground level 106. The housing 102 may be any number of physically separate pieces assembled together to form a single unit, as shown, that is any size, shape, volume, and has any material construction. For example, the housing 102 may consist of two identical chambers configured to be assembled together to form a unitary assembly.

In the non-limiting embodiment of FIGS. 1A-1E, the housing 102 has a hexagonal cross-sectional shape that is constructed of a rigid material, such as steel, aluminum, plastic, fiberglass, or any combination thereof. For instance, a surface, wall, or corner of the housing 102 may be constructed of plastic and reinforced by a metal or carbon-fiber. The housing 102 can be configured with any number of separated internal chambers that can be viewed from outside the housing 102 by a view port 108. One or more exterior mounted handles 110 can be positioned about the housing 102 to aid in lifting and maneuvering the housing 102 onto the underlying stand 112. The stand 112 can engage the housing 102 with a cradle portion 114 that can continuously extend from a mounting region 116 around to a side surface 118 of the housing 102.

The position and configuration of the cradle portion 114 can increase the system's susceptibility to wind and weather despite the cradle 114 being rigidly affixed to the housing 102 via one or more fasteners at the mounting region 116. The cradle portion 114 can be suspended above the ground level 106 by a plurality of support legs. A first support leg 120 of the stand 112 is configured as a ladder with multiple crossbeams allowing a user to easily climb from the ground level 106 to the top of the housing 102 to access a lid 122 and the chambers of the housing 102. In combination with the ladder first support leg, the stand 112 has a second support leg 124 positioned opposite to the first support leg 120. The respective legs 120/124 are connected via braces 126 that add stability and strength to the stand 112 and system 100.

It is contemplated that the stand 112 contacts the ground level 106 only via the first and second support legs 120/124. However, other embodiments extend stabilizing members 128 from the braces 126 to further strengthen the system 100. The position of the stabilizing members 128 are not limited to being connected to the braces 126 and can extend from other portions of the stand 112, such as the cradle 114 or support leg 120/124. The elevation of the housing 102 allows the first 130 and second 132 dispensing assemblies to be attached to apertures on the bottom side of the housing, side facing the ground level 106. The dispensing assemblies 130/132 can be any type and size of mechanism that selectively distributes food from inside the housing 102 to animals outside the housing 102, such as via either dispensing assembly 130/132 connected to separate chambers of the housing 102 to distribute food from both chambers.

Figure 1B:
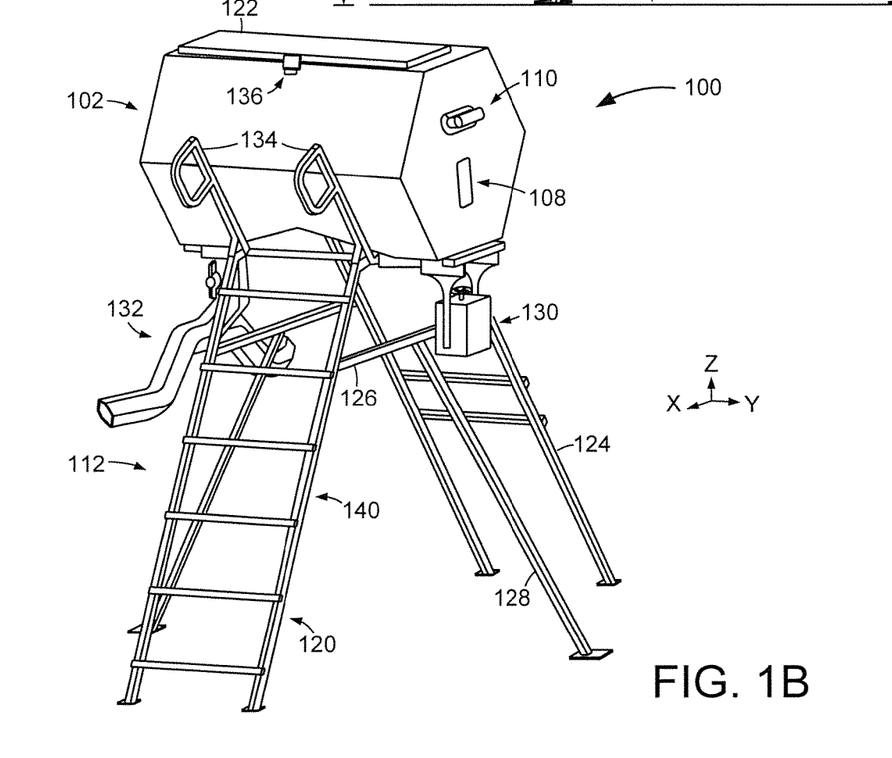

FIG. 1B displays the animal feeding system 100 from an opposite angle compared to FIG. 1A. The view of FIG. 1B shows how climbing assist members 134 can extend from the cradle portion 114 to provide handles for a user to safely and efficiently climb the ladder first support leg 120. The climbing assist members 134 can be shaped to contact the side surface 116 of the housing 102 to provide additional lateral support from the stand 112 to the housing 102. It is contemplated that the climbing assist members 134 can be removed, and installed, at will to allow a user to control pathway from the ground level 106 to the lid 122.

The lid 122 has a closure mechanism 136 that can seal the inside of the housing 102 from the top side. The closure mechanism 136 is not limited to a particular design and can be a clasp, button, spring, strap, or any combination thereof. The lid 122 may be connected to housing 102 via one or more hinges 138 and can employ more than one closure mechanisms 136 positioned at separate locations around the lid 122.

It is noted that various portions of the stand 112 can be separate pieces attached via a fastening means. Although not limiting, the support legs 120/124 can consist of multiple pieces interconnected via pinned connections 140. Pinned and other type of fasteners, such as nuts and bolts, screws, and clamps, can further be used to attach any aspect of the stand together. It is contemplated that some interconnections are not fastened and instead are held together via gravity, such as the climbing assist members 134.

The ability to construct the stand 112 as multiple separate pieces that fasten together to make a sturdy support for the housing 102 allows for efficient transport between feeding sites. However, it is contemplated that the stand is constructed as a single rigid piece of one or more materials joined via joints and or welds. Such a rigid single stand 112 may be constructed with any type of hollow material, such as round or square pipe/tube, or solid material, such as rod or plate.

Figure 1C:
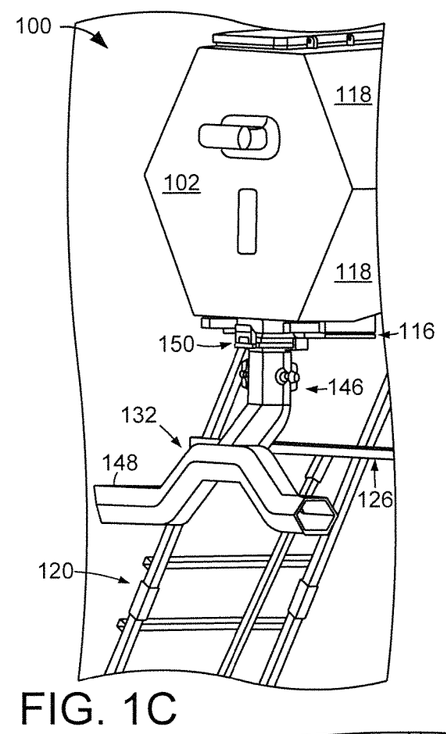

FIG. 1C depicts the first dispensing assembly 130 in greater detail. While not required or limiting, the first dispensing assembly 130 can be an electronic unit that activates one or more spinning wheels 142 to throw food falling from the aperture in the bottom side of the housing 102 away from the system 100. The spinning wheel(s) 142 can be configured to throw food in a circular or semi-circular pattern in response to an activation signal from a controller housed in a body 144 of the assembly 130. It is contemplated that a power source, such as a battery, is also stored in the body 144.

An activation signal may be triggered in an unlimited variety of manners. For instance, a timer can periodically activate the assembly 130 at predetermined times of day for a predetermined amount of time. As another instance, one or more sensors can be used to optically, acoustically, or electrically sense the presence of an animal to trigger the activation signal. In some embodiments, the first dispensing assembly 130 can identify a quantity of food in the housing 102 and responds by altering a predetermined feeding schedule to prolong the dispensing of food.

Figure 1D:
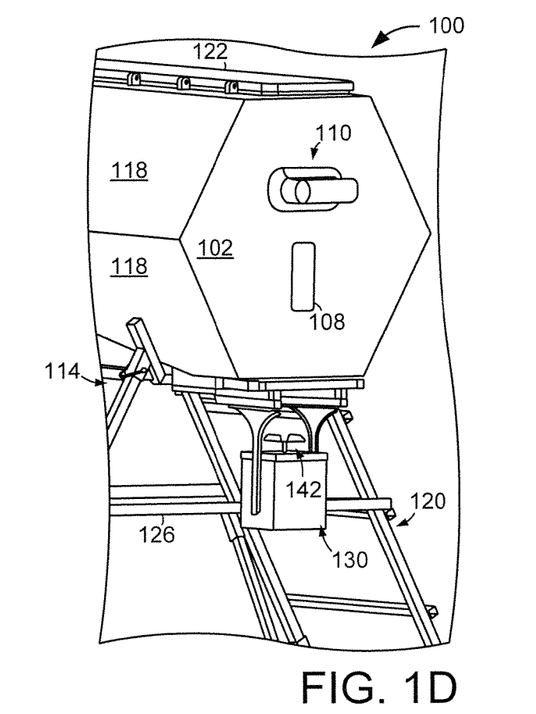

The second dispensing assembly 132 is shown in FIG. 1D. The assembly 132 has at least one valve 146 that can be manually, or automatically, articulated to allow food to pass from a chamber inside the housing 102 to the dispensing tube 148. The tube 148 can be arranged in an unlimited variety of manners that can selectively dispense food with the aid of gravity. The second dispensing assembly 132 can be automatically triggered to open, or close, in response to any number and type of sensor, such as optical, mechanical, and electrical sensors mounted on, or around, the animal feeding system 100.

An example embodiment configures the dispensing tube 148 to have multiple different diameters and bends to allow food to fall from the housing 102 without reaching the ground level 106. That is, the dispensing tube 148 has a shape, size, and internal diameter configuration that allow gravity to pull food from the housing 102 and retain the food within the tube 148 while positioning the food a predetermined elevation above the ground level 106 where animals can feed.

As shown, the dispensing tube 148 has a symmetrical shape about the longitudinal axis of the housing 102 with two separate openings where food can reside and be consumed by various animals. It is contemplated that the dispensing tube 148 have more than two separate openings, an asymmetrical shape, and/or covers for the respective openings, none of which are required or limiting. FIG. 1D illustrates how the dispensing tube 148 is attached to the housing 102 via a closing mechanism 150, which may be a tab, clasp, button, lever, strap, or any combination thereof that secures the dispensing tube 148 to receive food from an aperture in the bottom side of the housing 102.

Figure 1E:
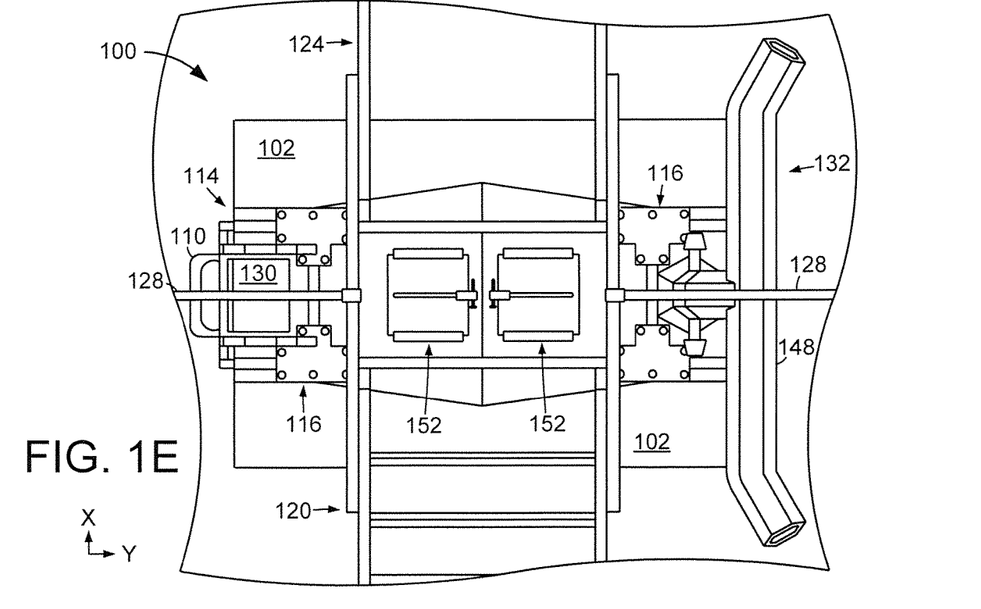

The bottom side of the animal feeding system 100 is displayed in FIG. 1E. The orientation of the respective support legs 120/124 to the cradle 114 show how fasteners can be utilized to interconnect and secure the constituent pieces of the stand 112 together. It is contemplated that at least some of the pieces of the stand 112 are press fit, clamped, or nested inside one another with, or without, fasteners. Regardless of how the constituent pieces of the stand 112 are interconnected, the cradle is attached to the housing 102 via a plurality of fasteners at various mounting regions 116. The use of multiple fasteners at multiple different regions 116 provides a reliable attachment between the stand 112 and housing 102 that allows the housing 102 to contain hundreds of pounds of food without the stand shifting or toppling in response to wind or animals engaging the animal feeding system 100.

The bottom view of FIG. 1E shows how the first dispensing assembly 130 is positioned wholly underneath the housing 102, which shields the assembly 130 from weather. That is, the first dispensing assembly 130 is positioned between the housing 102 and the ground level 106. In comparison, the dispensing tube 148 of the second dispensing assembly 132 extends outside the areal extent, and exterior boundary, of the housing 102 to allow animals ample room to engage the dispensing tube 148 without disturbing the stand 112 or housing 102.

Each internal chamber of the housing 102 is configured with an evacuation aperture 152 that is filled by a door that can be selectively opened to allow food to easily and quickly evacuate the respective chambers. The evacuation apertures 152 can be individually, or collectively engaged via sliding or hinged connections to the housing 102. The ability to individually open or seal a chamber by articulating the door in an evacuation aperture 152 allows for efficient cleaning and swapping of food in a chamber.

Figures 2A, 2B, 2C:
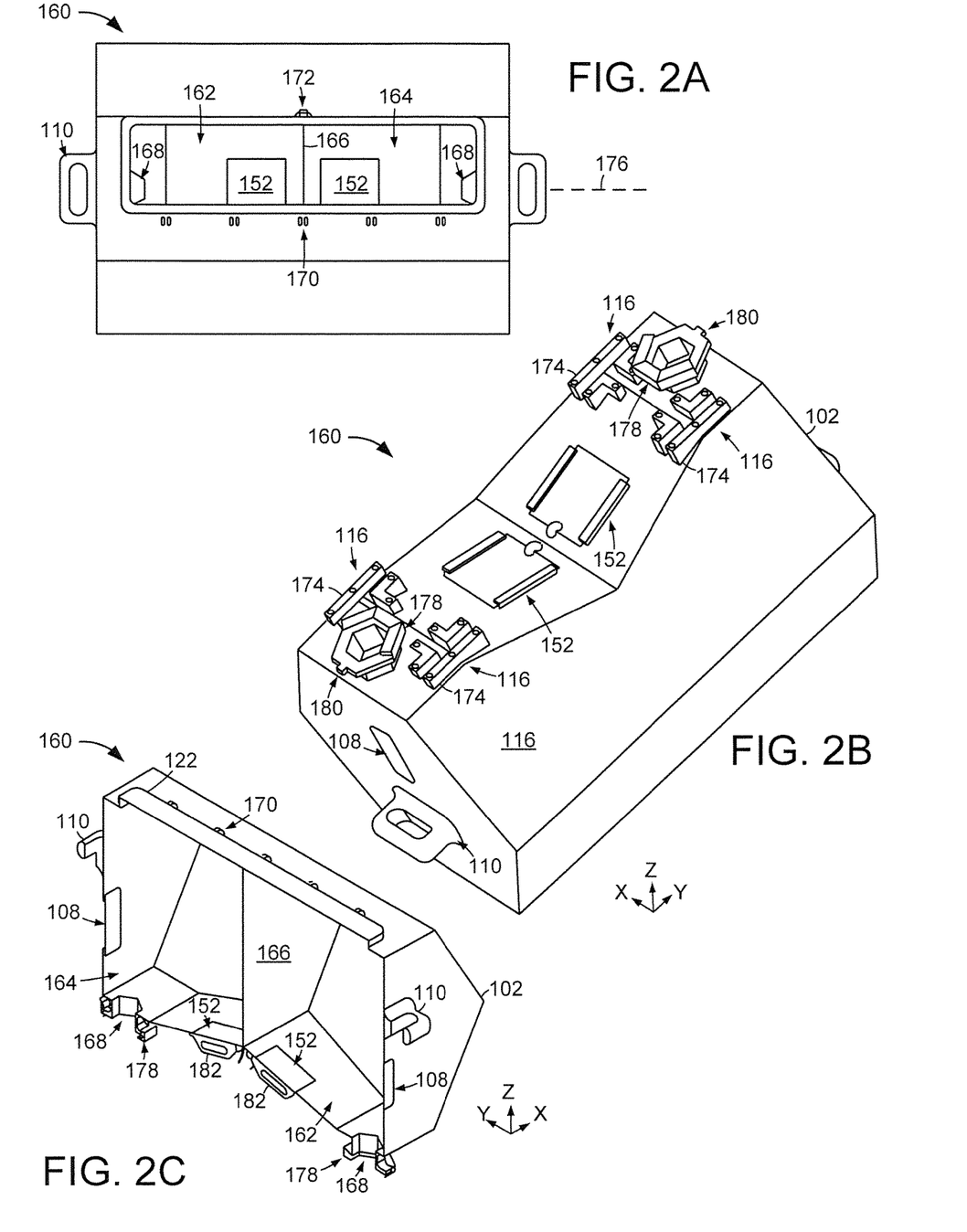
FIGS. 2A-2C respectively display an example housing capable of being utilized in the animal feeding system of FIGS. 1A-2E in various embodiments.

FIGS. 2A-2C respectively depict different portions of an example housing 160 that can be utilized in the animal feeding system of FIGS. 1A-1E in accordance with some embodiments. FIG. 2A displays a top view line representation of the housing 160 without a lid, such as lid 122, to show portions of the first 162 and second 164 internal chambers. The chambers are separated by at least one midplane 166 that prevents cross-contamination of food between the chambers 162/164. The top side of the housing 160 has multiple connection apertures 170 and at least one closure mechanism 172. While not required or limiting, the connection apertures 170 can connect to a hinge or protrusion of the lid to limit lid movement to a predetermined range and the closure mechanism 172 can be any arrangement that applies force on the lid towards the housing 160.

The chambers 162/164 are each arranged with a sloping bottom side that directs food over an evacuation aperture 152 towards a dispensing aperture 168, as shown in FIG. 2B. The orientation of the housing 160 in FIG. 2B further shows how each mounting region 116 has standoffs 174 that provide a uniform mounting plane that positions the housing 160 substantially level when attached to a stand 112. That is, the assorted standoffs 174 accommodate the varying dimensions of the bottom side of the housing 160 to position a stand 112 in a level plane where a longitudinal axis 176 of the housing 160 is substantially perpendicular to gravity.

In FIG. 2B, as well as the cross-sectional view of FIG. 2C, the dispensing aperture 168 is shown being elevated from the bottom side of the housing 160, which allows the dispensing assemblies 130/132 to be mounted to the housing 160 while the stand 112 is affixed to the mounting regions 116. The dispensing apertures 168 each have a bracket 178 that receives a dispensing assembly 130/132. The bracket 178 is arranged, but not limited, to surround a portion of the dispensing assembly 130/132 to support the weight of an assembly 130/132 against gravity. The bracket 178 can further be configured to orient the dispensing assembly 130/132 to align with the dispensing aperture 168.

In operation, the bracket 178 can hold the dispensing assembly 130/132 in place without user support until the user can articulate a closure mechanism to secure the dispensing assembly 130/132 to the dispensing aperture, as illustrated in FIGS. 1C & 1D. The dispensing aperture 168 may be configured with a protrusion 180, as shown in FIG. 2B, that is engaged by a closure mechanism, such as a clasp or level, to secure the dispensing assembly 130/132 in contact with the bracket 178 and in alignment with the dispensing aperture 168.

Various embodiments configure a door of the evacuation aperture 152 as a spring-assisted structure that can automatically open when the weight within the chamber 162/164 overcomes the closure force of the structure. FIG. 2C illustrates how the evacuation aperture 152 doors can have handles 182 and hinged connections to the housing 102 that may, or may not, be spring assisted. The ability to construct the evacuation aperture 152 doors in a variety of different configurations, like with springs, hinges, and handles, allows the evacuation aperture 152 to be efficiently opened or reliably maintained in a closed position.

For instance, the evacuation aperture 152 door can be configured to open automatically if the chamber fills with water and/or debris that is heavier than food. As another non-limiting embodiment, a spring-assisted evacuation aperture 152 door can partially open automatically or manually to remove some, but not all, of the inventory stored in the corresponding chamber 162/164.

Figures 3, 4, 5:
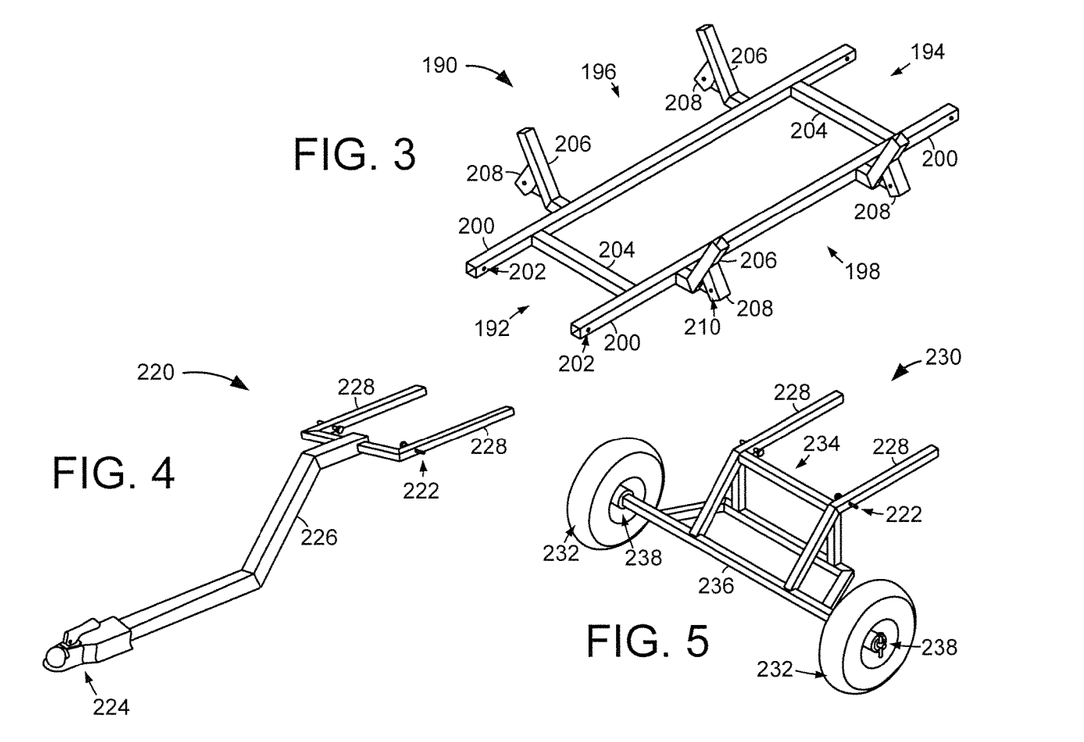
FIG. 3 illustrates a portion of an example stand that can be employed in the animal feeding system of FIGS. 1A-2E in assorted embodiments.
FIG. 4 depicts an example transport assembly that may be used in the animal feeding system of FIGS. 1A-2E in some embodiments.
FIG. 5 shows an example transport assembly that can be utilized by the animal feeding system of FIGS. 1-2E in various embodiments.

Turning to FIG. 3 where a cradle portion of an example stand 190 is displayed. The cradle portion is constructed of hollow rigid material, such as steel or aluminum, that is formed, bonded, welded, or joined to present two receiving features 192 and 194 as well as two lateral features 196 and 198. Each receiving feature 192/194 has multiple female style couplers 200 with an opening 202 for one or more fasteners. Any number of crossbeams 204 can secure the shape and size of the various features 192/194/196/198 relative to each other and to a housing that is secured to the cradle portion via plates and fasteners, as shown in FIG. 1E.

Each lateral feature 196/198 has multiple cantilevered protrusions 206 that may be hollow to receive a component, such as climbing assist member 134, or may be closed. The position, size, and shape of the various cantilevered protrusions 206 are customized to match a bend in the housing, such as where bottom and side surfaces of the housing intersect. Hence, the protrusions 206 provide lateral support to the housing.

The cantilevered protrusions 206 present leg receptacles 208 are configured to receive the first 120 or second 124 support legs and secure the legs to the cradle portion via fastener apertures 210. It is noted that the cradle portion may have any number of protrusions 206 that may have matching configurations, such as size and or may be dissimilarly configured. For instance, the cantilevered protrusions 206 on one side of the cradle portion may be longer, have a greater diameter, or can extend contact greater amount of housing surface area, such as via a plate, than the protrusions on the opposite side of the cradle portion.

The receiving features 192/194 can be engaged by any number and type of component. In some embodiments, the cradle portion can be utilized to support transport components that easily, safely, and efficiently allow the animal feeding system to be transported. FIG. 4 displays an example first transport assembly 220 that can be permanently or temporarily secured to the couplers 200 of either receiving feature 192/194 via a fastener 222, such as the illustrated pin fastener.

The transport assembly 220 can continuously extend to one or more trailer couplers 224 that can engage and be secured to a trailer hitch. A tongue member 226 can connect the trailer coupler(s) 224 to the insertion members 228 that fit within, or over, the cradle couplers 200 and are secured in-place via the fasteners 222. The tongue member 226 may be any shape, size, and material. For instance, the tongue member 226 may have one or more linear, or curvilinear, bends that present the trailer coupler(s) 224 at a different elevation above ground level than the insertion members 228.

While the first transport assembly 220 can be adapted to connect to a hitch of a vehicle, such as a truck, car, all-terrain vehicle (ATV), or motorcycle, an animal feeding system will not efficiently move without some type of turning wheel. Accordingly, the second transport assembly 230 of FIG. 5 can concurrently engage one receiving feature 192/194 while the first transport assembly 220 is secured to the other receiving feature 192/194 to provide turning wheels 232. The combination of the first 220 and second 230 transport assemblies being secured to the cradle portion 190 via the couplers 200 of the respective receiving features 192/194 allows the cradle portion, and the attached housing, to be easily and safely transported anywhere by being hooked to a vehicle through the first transport assembly 220 and by rolling via the second transport assembly 230.

The second transport assembly 230 has a rolling chassis 234 that consists of a several joined pieces of material that physically support the load of the attached cradle 190 and housing 160. The size, shape, and configuration of the rolling chassis 234 is not limited to the arrangement shown in FIG. 5 and can be constructed in any manner, with similar or dissimilar materials, to translate force from the cradle 190 via the insertion members 228 affixed to the cradle couplers 200 via fasteners 222.

In the non-limiting embodiment of FIG. 5, the rolling chassis 234 concurrently provided vertical (Z axis) and horizontal (X-Y plane) support to an axle tube 236. The Axle tube 236 may be hollow and contain a turning axle or may be partially, or completely, solid with turning bearings 238 located at opposite sides, proximal each wheel 232. The respective wheels 232 can be permanently affixed or pressed onto the bearings 238 or rotating axle, but alternatively can be temporarily mounted to the rotating portion of the second transport assembly (axle/bearings). Such temporary mounting can be facilitated by one or more connectors, such as, but not limited to, the pinned connector shown in FIG. 5.

Figure 6:
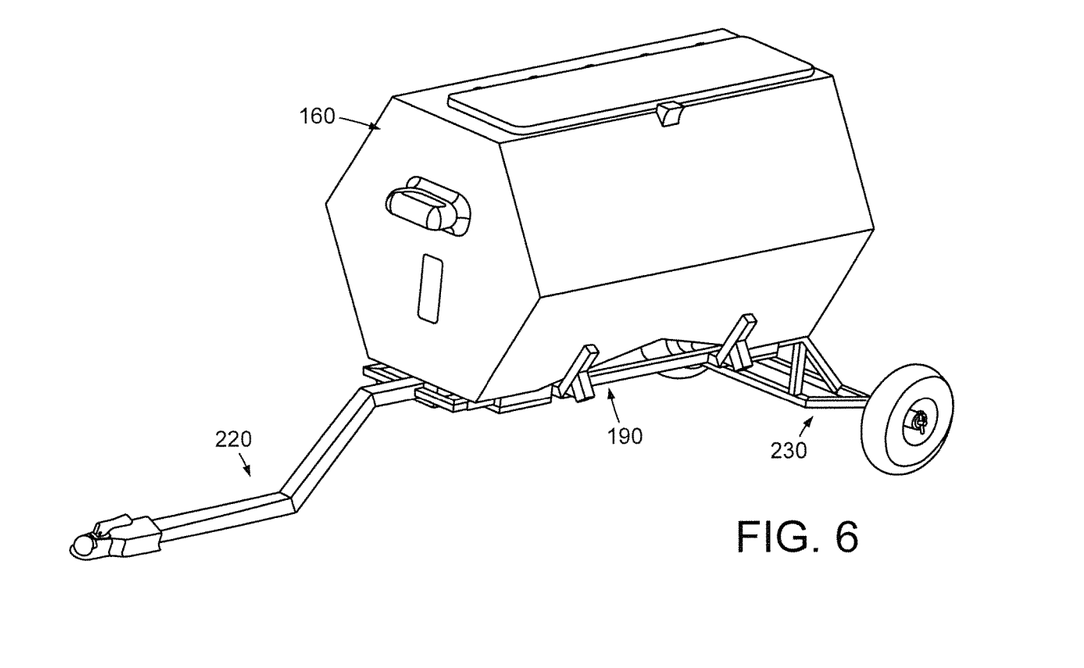
FIG. 6 represents a line representation of an example animal feeding system arranged in accordance with assorted embodiments.

FIG. 6 conveys how the first 220 and second 230 transport assemblies can attach to the cradle 190 to move the housing 160. The configuration of the cradle 190 allows the housing 160 to remain attached during transport while the rigid and robust configuration of the transport assemblies 220/230 allows the housing to remain partially, or completely, filled with food. That is, it is contemplated that the housing 160 can be moved with food contained therein due to the strength and fastened attachment of the transport assemblies 220/230 to the cradle 190.

It is noted that the position of the wheels 232 behind the housing 190 provides increased stability relative to a wheel position under the housing 190. In other words, placing the wheels 232 away from the areal extent of the housing 190 distributes the weight of the cradle 190, housing 160, and any contained food to provide optimized balance and stability compared to if the wheels 232 were positioned within the areal extent of the housing 190.

Figure 7:
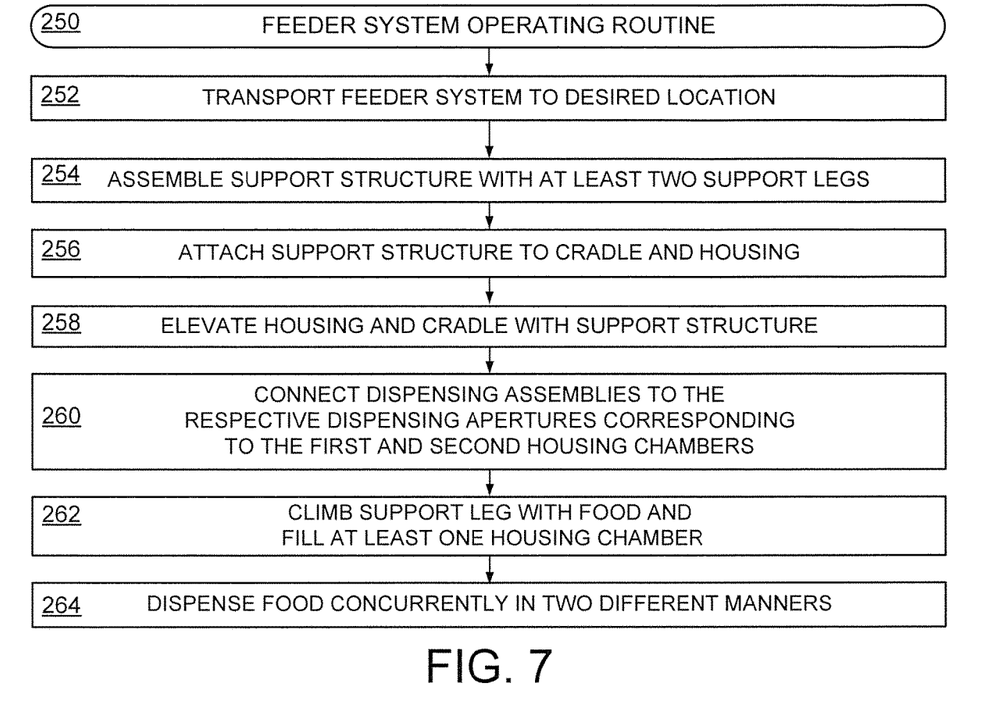
FIG. 7 provides an example feeder system operating routine that may be carried out by the animal feeding system of FIGS. 1A-6.
Figure 8:
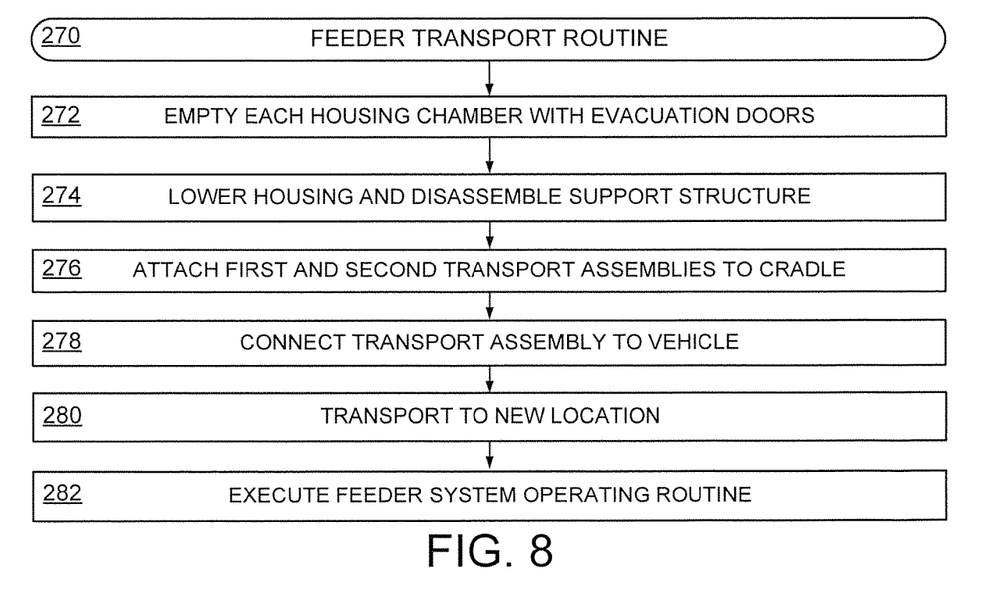
FIG. 8 is an example feeder transport routine that is executed by the animal feeding system of FIGS. 1A-7.

The various embodiments of FIGS. 1-6 can be practiced in the feeder system operating routine 250 of FIG. 7 and the feeder transport routine 270 of FIG. 8. In FIG. 7, the feeder system operating routine begins with step 252 transporting a feeder system to a desired location. Such transport may be conducted via the transport assemblies of FIGS. 5 & 6, but such arrangement is not required.

It is noted that step 252 is assumed to have the various portions of the feeder system disassembled bundled. However, some separate components may be previously assembled prior to step 254 assembling the support structure of the feeder system. For example, the cradle may be affixed to the housing at the mounting regions prior to step 254. Regardless of when pieces are connected together, the housing is mounted to the cradle and at least two support legs are assembled at the conclusion of step 254.

The assembled support legs from step 254 are then attached to the cradle in step 256, which may involve positioning on or more fasteners. Next, the connected support structure is used to elevate the housing and cradle in step 258. In some embodiments, step 258 further involves assembling and attaching one or more stabilizing members, but such action is not required. The elevated housing provides enough room for a user to connect different types of dispensing assemblies to the respective dispensing apertures of the housing in step 260. While any dispensing assembly can be connected in step 260, various embodiments place the dispensing assembly in the dispensing aperture bracket to align the assembly with the dispensing aperture prior to securing the dispensing assembly's position by articulating one or more closure mechanism.

The feeder system is fully constructed at the end of step 260 and can appear as shown in FIGS. 1A-1E. At any time after step 260, a user can climb the ladder support leg of the feeder system to fill at least one housing chamber with food in step 262. It is contemplated that step 262 is conducted multiple times, and perhaps with the aid of climbing assist members, in order to put multiple different types of food in respective chambers of the housing.

The availability of food in the housing and the attachment of the respective dispensing assemblies allows step 264 to dispense food in response to activity and/or predetermined stimuli from a sport animal. It is contemplated that at any given time, each dispensing assembly of the feeder system can be dispensing food concurrently in response to one or more animals. For instance, an electronic food spreading dispensing assembly can respond to a detected first animal with a first food from a first chamber of the housing simultaneously as an animal physically engages a gravity-fed dispensing assembly to eat a second food from a second chamber of the housing. In another non-limiting example, step 264 may dispense a first food to attract animal(s) to the housing while a second food is dispensed from a different dispensing assembly to provide nutrients that are not contained in the first food.

The ability to selectively dispense different types of food with different dispensing means allows the feeder system to provide diverse food delivery that can engage and enrich more numbers and types of sport animals than traditional elevated food dispensers. Furthermore, the ability to easily transport the feeder system allows a user to engage more animals in a greater range than traditional food dispensers. FIG. 8 provides a feeder transport routine 270 that can be conducted to move a feeder system to a different physical location.

Initially, the transport routine 270 has a constructed and operating feeder system, such as a feeder system after step 264 of FIG. 7. Step 272 proceeds to empty each chamber of the housing via the respective evacuation apertures, such as by manually articulating doors of each evacuation aperture. The emptying of the housing is optional as some embodiments skip step 272 and keep food within the housing during routine 270. The housing and attached cradle are then lowered in step 274 by manipulating the support legs of the system. It is contemplated that step 274 also involves disassembling some, or all, of the housing/cradle support structure by removing all fasteners and connectors of the respective support legs and stabilizing members.

Step 276 then attaches first and second transport assemblies to the cradle, which may involve inserting one or more fasteners. The transport assemblies can be any wheeled mechanism, such as assemblies 220 & 230, and may have a motorized component that allows the feeder system to self-propel. The attaching of the transport assemblies in step 276 may also involve attaching the previously disassembled support structure of the feeder system to the housing, cradle, and/or the transport assemblies.

In example embodiments where an engine, motor, hydraulic machine, or pneumatic mechanism is incorporated into a transport assembly and/or the cradle, the first transport assembly may, or may not, be omitted to allow an external vehicle to securely connect and move the feeder system. The connection of a transport assembly that has a trailer coupler triggers step 278 to connect the feeder system to a vehicle. Situations where a motorized component is incorporated into the feeder system may prompt routine 270 to skip step 278.

Next, step 280 utilizes the mechanical power of the external vehicle, or from a motorized component of the feeder system itself, to transport the feeder system to a new physical location. The use of wheels in a transport assembly allows step 280 to efficiently and safely relocate the feeder system to anywhere that a motorized vehicle can travel. The capabilities of step 280 may be expanded if one or more transport assemblies has a suspension component that can dampen and/or absorb shock, vibration, and trauma on the feeder system associated with traversing rough terrain.

Successful arrival at a new location prompts step 282 to execute the feeder system operating routine 250 of FIG. 7 to erect the housing, fill the feeder system with food, and dispense the food to animals. Through the assorted embodiments of this disclosure, a feeder system can provide optimized animal feeding along with efficient and safe transport to a variety of physical locations. The ability to erect, disassemble, and transport an animal feeding system having over a 30 gallon food capacity and weighing over 100 pounds with one person and a vehicle, such as an ATV, can increase the effectiveness of the feeder system while improving the delivery of nutrition to sport animals.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed.

What is claimed is:

1. A system comprising:
   a housing;
   a stand physically supporting the housing a predetermined distance above a ground level;
   a first dispensing assembly attached to a first dispensing aperture of the housing; and
   a second dispensing assembly attached to a second dispensing aperture of the housing, the first and second dispensing assemblies being different and physically separated by being respectively positioned on opposite ends of the housing.

2. The system of claim 1, wherein the first dispensing aperture connects to a first chamber of the housing and a second port connects to a second chamber of the housing.

3. The system of claim 2, wherein the first and second chambers are separated within the housing.

4. The system of claim 1, wherein the first dispensing aperture comprises a bracket physically contacting and surrounding a portion of the first dispensing assembly to support the weight of the first dispensing assembly against gravity.

5. The system of claim 4, wherein the first dispensing aperture comprises a protrusion engaged by a closure mechanism to secure the first dispensing assembly in contact with the bracket.

6. The system of claim 1, wherein the stand comprises a cradle portion continuously extending to opposite sides of the housing.

7. The system of claim 6, wherein the cradle portion concurrently contacts a first surface, second surface, and third surface of the housing.

8. The system of claim 7, wherein the first, second, and third surfaces respectively face different directions.

9. The system of claim 6, wherein the cradle portion comprises a climbing assist member.

10. The system of claim 6, wherein the cradle portion attaches to a first support leg and a second support leg.

11. The system of claim 10, wherein the first support leg comprises a ladder.

12. The system of claim 10, wherein a first stabilizing member and second stabilizing member each extend to the ground level between the first and second support legs.

13. An apparatus comprising a housing elevated a distance above a ground level by a stand, the housing having first and second separate chambers respectively connected to a gravity tube and an electronic spinning wheel each arranged to independently distribute food from the respective first and second chambers the stand comprises an axle onto which first and second wheels are attached.

14. The apparatus of claim 13, wherein the housing comprises a first evacuation aperture connected to the first chamber and a second evacuation aperture connected to the second chamber.

15. The apparatus of claim 13, wherein the stand comprises a hitch receiver.

16. The apparatus of claim 15, wherein the housing is disposed between the axle and hitch receiver.

17. A method comprising:
   positioning a housing a predetermined distance above a ground level with a stand;
   inserting a first food into a first chamber of the housing;
   inserting a second food into a second chamber of the housing;
   dispensing the first food from the housing with a first dispensing assembly via a first dispensing aperture; and
   dispensing the second food from the housing with a second dispensing assembly via a second dispensing aperture, the first and second dispensing assemblies being different and respectively positioned on opposite ends of the housing.

18. The method of claim 17, wherein the first and second dispensing assemblies concurrently dispense the respective first and second foods in response to different trigger events.

* * * * *